Dec. 24, 1940.  F. STONER  2,226,027
TRACTOR
Filed July 13, 1938  6 Sheets-Sheet 1
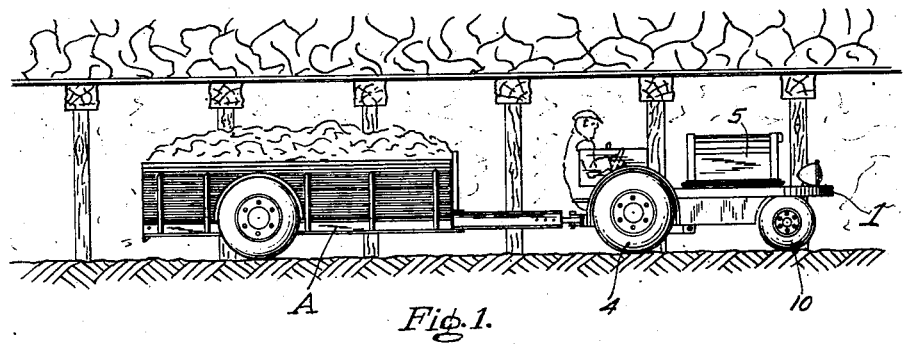
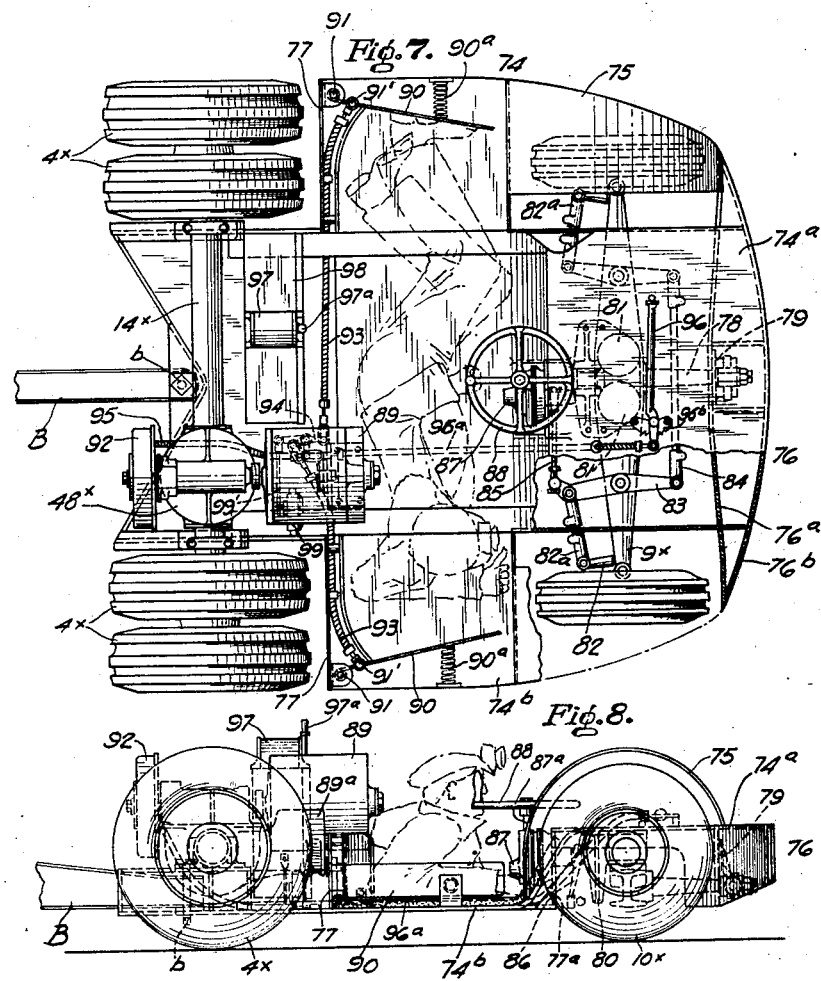
INVENTOR
Frank Stoner
BY Geo. B. Pitts
ATTORNEY Dec. 24, 1940.　　　　F. STONER　　　　2,226,027
TRACTOR
Filed July 13, 1938　　　　6 Sheets-Sheet 2

Inventor
Frank Stoner
By Geo. B. Pitts
Attorney

Dec. 24, 1940.  F. STONER  2,226,027
TRACTOR
Filed July 13, 1938   6 Sheets-Sheet 3
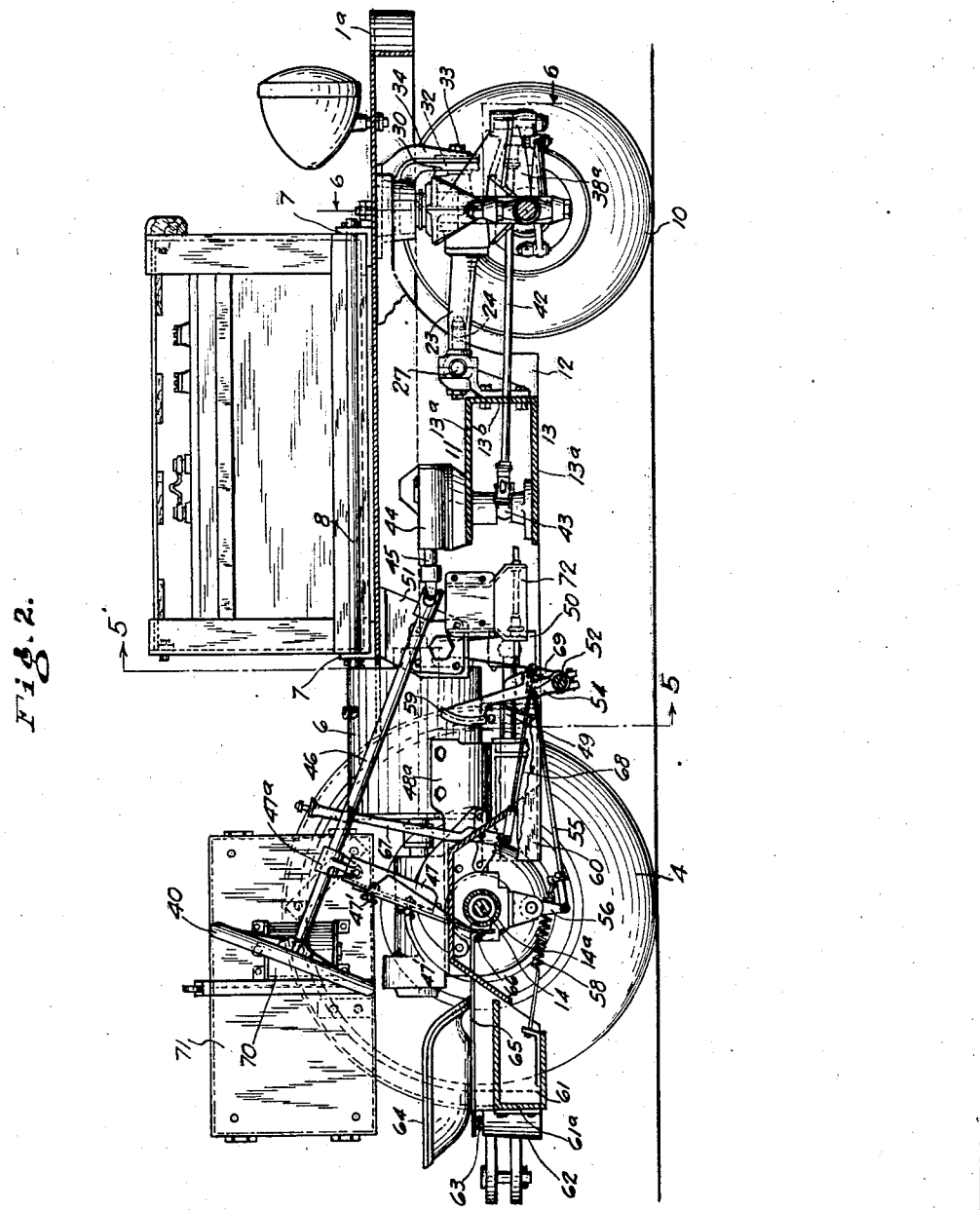
INVENTOR.
Frank Stoner
BY
Geo. B. Pitts
ATTORNEY.

Dec. 24, 1940.                F. STONER                2,226,027
                                TRACTOR
                          Filed July 13, 1938           6 Sheets-Sheet 4

INVENTOR.
Frank Stoner
BY Geo. B. Pitts
                                                    ATTORNEY.

Dec. 24, 1940.  F. STONER  2,226,027
TRACTOR
Filed July 13, 1938  6 Sheets-Sheet 5

INVENTOR.
Frank Stoner
BY Geo. B. Pitts
ATTORNEY.

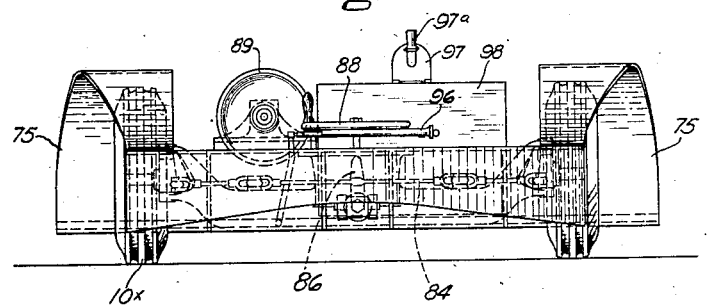
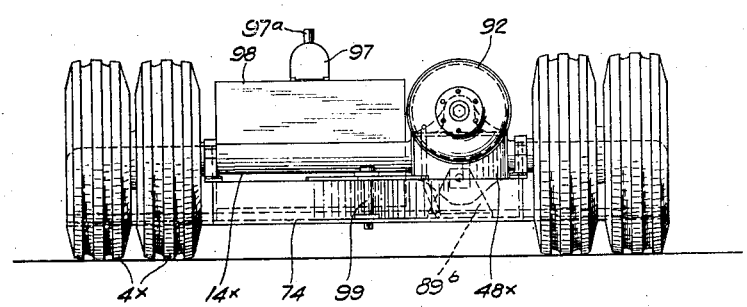

Patented Dec. 24, 1940

2,226,027

UNITED STATES PATENT OFFICE 2,226,027

TRACTOR

Frank Stoner, Lakewood, Ohio, assignor to The Baker-Raulang Company, Cleveland, Ohio, a corporation of Ohio Application July 13, 1938, Serial No. 219,002

4 Claims. (Cl. 180—54)

This invention relates to a tractor for use in mines. Heretofore, so far as I have knowledge, all mechanical hauling in mines and movement of the digging equipment therein was effected by means of electric locomotives, the wheels of which ran on tracks. These conditions necessitated considerable expense in providing a substantially level foundation for the tracks through the entry and work rooms, laying of the tracks and their upkeep, as well as limiting the movement of the locomotives along predetermined routes; it also involved the expense of providing track switches leading from the entry into the respective work rooms and extra tracks for storage of the locomotives, aside from the labor involved in supplying this track equipment to the various locations when the same was to be laid.

By the use of my improved tractor, these expenses are eliminated and many advantages have been found to result in reducing labor costs, simplifying loading and unloading operations, speeding up transportation and moving the tractor from one position to another, since trackage therefor is not required. Also, one tractor can pass another tractor in an entry or work-room and this materially facilitates operations of hauling filled trail cars and returning the trail cars to the place of loading.

One object of the invention is to provide an improved tractor wherein its power means, control equipment and driving station are co-operatively arranged to permit travel thereof and hauling operations in the entry of work rooms of mines where over-head clearance is limited.

Another object of this invention is to provide an improved tractor of this type wherein the driver's station and mountings for the control devices are arranged to provide for operation of the tractor in areas having limited head room.

Another object of the invention is to provide an improved tractor wherein its frame supports on its upper side the power means and on its lower side other equipment for mounting the wheel axles and driving and controlling the operation of the tractor, whereby the height and length of the tractor is reduced to meet the conditions present in a mine.

Another object of the invention is to construct an improved tractor of this character wherein provision is made to position the driver between the driving wheels, whereby the latter may be of a size to insure adequate speed and tractive effort and the driver located at a relatively low level.

Other objects of the invention will be apparent to those skilled in the art to which my invention relates from the following description taken in connection with the accompanying drawings, wherein—

Fig. 1 is a fragmentary view of a work room in a mine and showing in side elevation a tractor embodying my invention and a loaded trail car connected thereto.

Fig. 2 is a section on the line 2—2 of Fig. 1a.

Fig. 7 is a plan view of a modified form of construction, showing a portion of a trail car.

Figs. 8, 9 and 10 are side, front and rear elevations, respectively of the form of construction shown in Fig. 7.

Figure 1A:
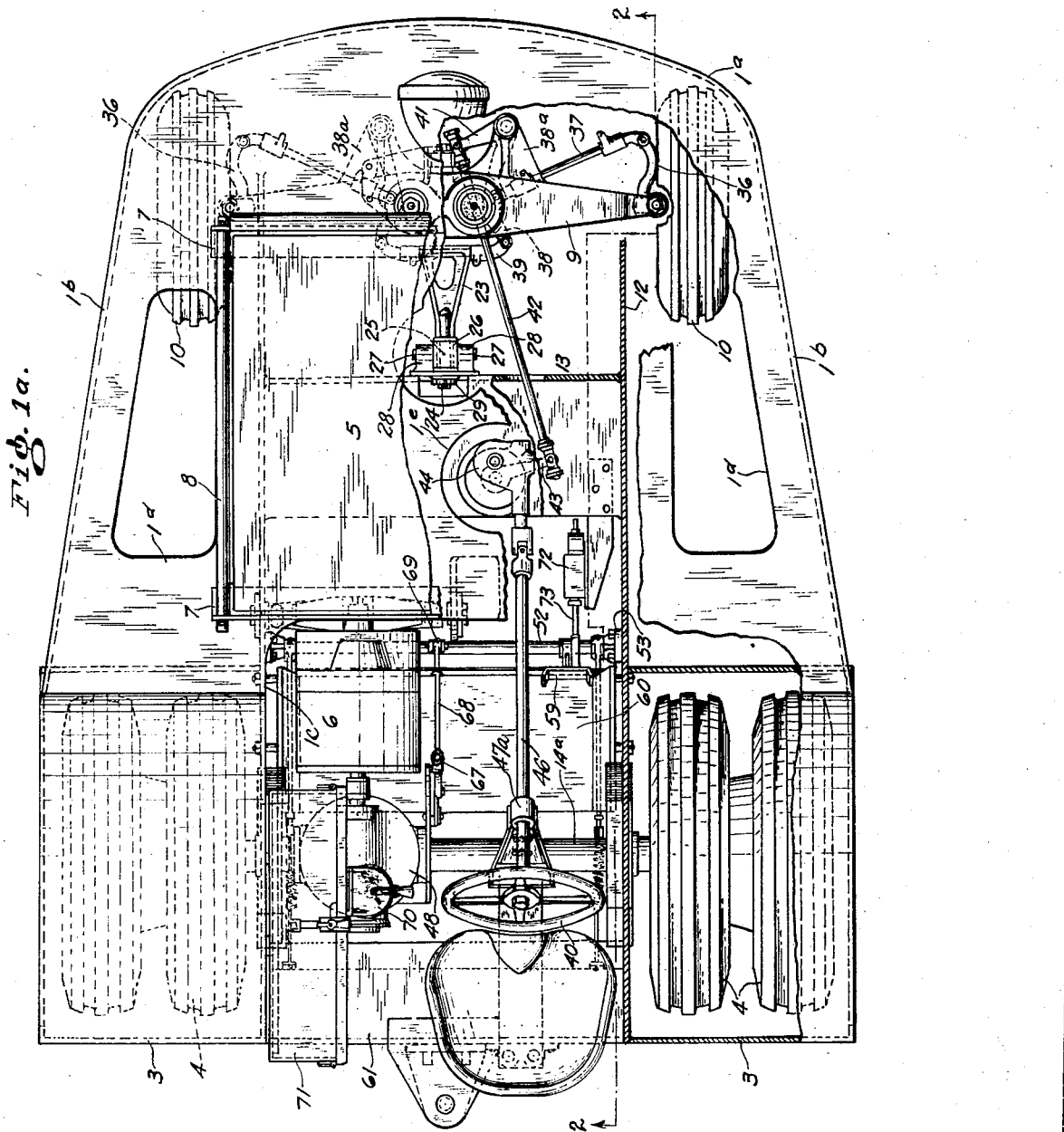
Fig. 1a is a plan view of the tractor (enlarged) with parts broken away.
Figure 3:
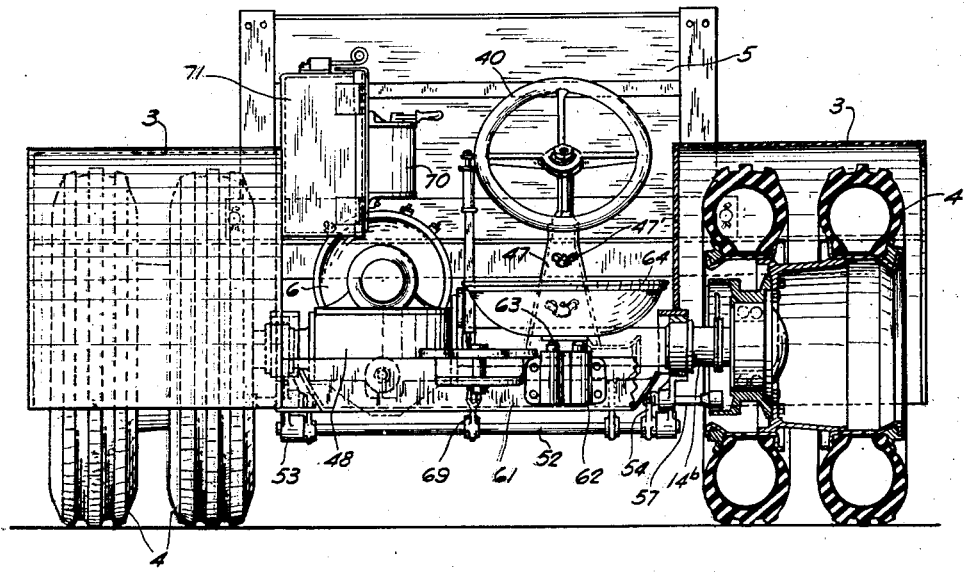
Fig. 3 is a rear elevation, partly in cross section.
Figure 4:
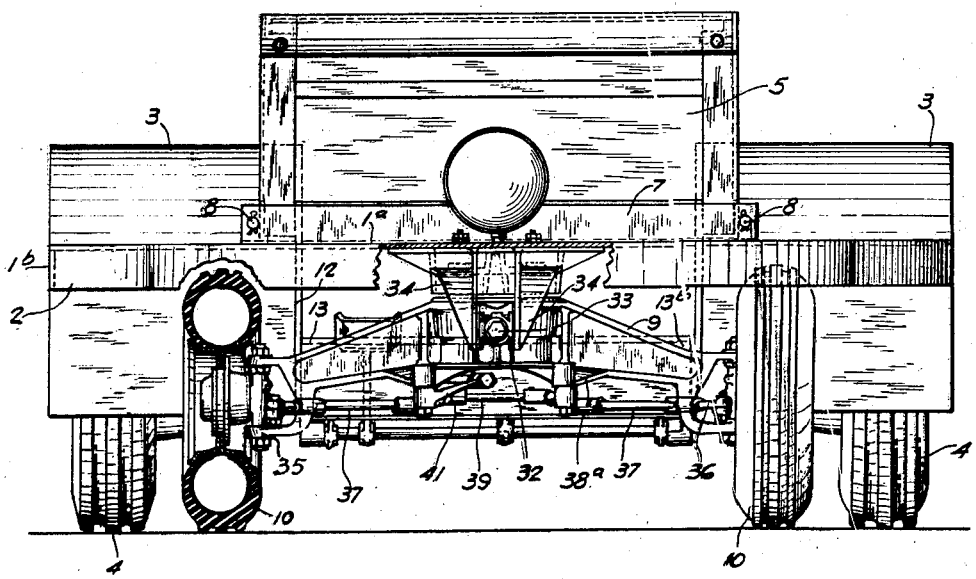
Fig. 4 is a front elevation, partly in section.
Figure 5:
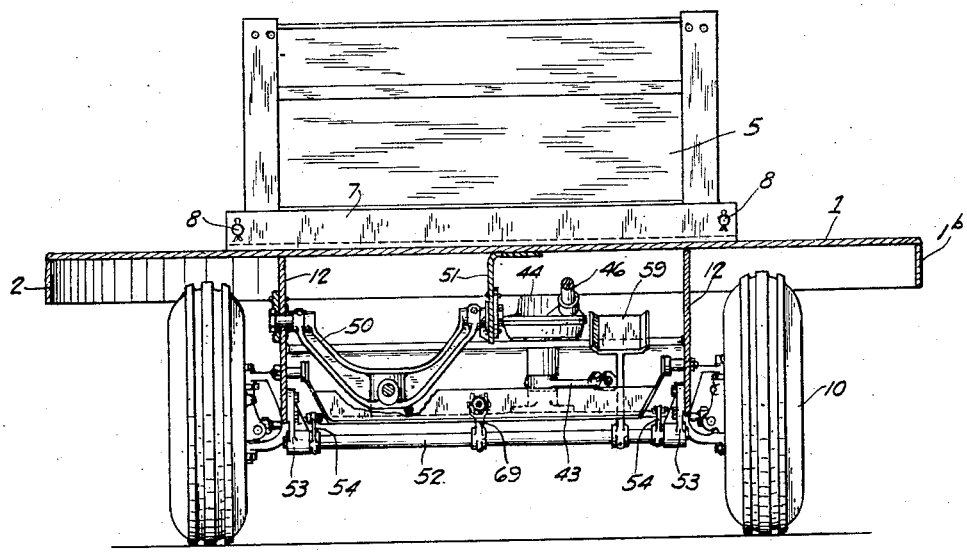
Fig. 5 is a section on the line 5—5 of Fig. 2.

In the drawings, 1 indicates as an entirety a main frame having a rounded or curvilinear front end 1a and sides 1b, which preferably have a diverging relation, the front end and sides being reinforced by a continuous depending flange 2. This arrangement permits the front end 1a of the frame to engage a swinging door or doors and swing them to open position in driving the tractor forwardly to permit passage through the door. At the rear end of the frame 1 its lateral portions are rigidly connected to housings 3, which extend over the rear drive wheels 4, and its intermediate portion is cut away as shown at 1c to enlarge the space between the wheels 4 for a purpose later to appear. The frame 1 is provided with openings 1d, 1e, to reduce its weight and permit access to various parts. The frame 1 forms a platform or base for the power means 5, which is shown as consisting of suitable storage batteries to supply current to a motor 6. Transversely arranged angles 7 are mounted on the frame 1 to form a track and guides for the batteries 5, whereby the batteries may be slid on and off the frame 1 laterally, the up-standing portions of the angles serving as abutments to prevent shifting of the batteries longitudinally of the frame 1 in starting and stopping the tractor. The corresponding ends of the angles 7, at the lateral sides of the batteries 5, are formed with openings to removably receive rods 8, which prevent lateral shifting of the batteries on the angles, especially when rollers are provided between the batteries and the angles to facilitate their removal and replacement. The rods 8 are preferably held in position by cotter pins engaging the opposite outer sides of the angles.

9 indicates an axle mounted below and inwardly of the front end 1a of the frame 1 in the manner hereinafter set forth and carrying at its opposite ends dirigible wheels 10.

11 indicates as an entirety an under-frame consisting of spaced, parallel plates 12 depending from the frame 1 and a supporting member 13 extending between and connected at its opposite ends to the plates 12 substantially in the plane of the axle 9 and axle 14 for the drive wheels 4. The plates 12 extend rearwardly to form the outer end of the wheel housings 3 to form the inner side walls thereof and support other parts hereinafter referred to. The supporting member 13 consists of upper and lower walls 13a and a front wall 13b.

Figure 6:
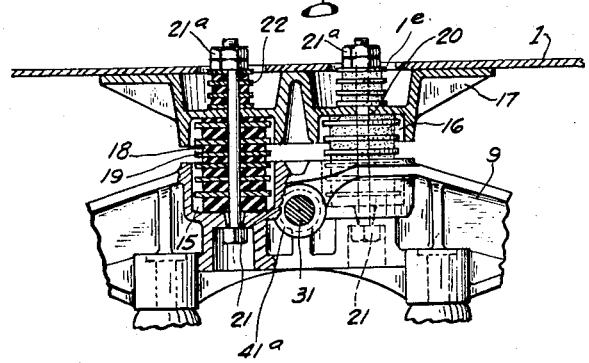
Fig. 6 is a fragmentary section on the line 6—6 of Fig. 2.

The front axle 9 is mounted in the following manner: the upper side of the axle 9 is provided with pockets 15 each of which is alined with a pocket 16 provided on the lower side of a casting 17 suitably fixed to the under side of the frame 1 (see Fig. 6). The pockets 15, 16, receive cushioning devices to cushion jars imparted to the frame 1 during operation of the vehicle. The cushioning devices for each pair of alined pockets preferably comprise a series of rubber disks 18 with interposed pads 19 between them, formed with openings in registry with centrally disposed openings 20 formed in the bottom walls of the adjacent pockets 15, 16, to receive a bolt 21. The bolts serve as connections to limit undue relative movement between the frame 1 and axle 9. By preference, I provide a series of cushioning devices 22, similar to those just described, between each pocket 16 and the nut 21a on the adjacent bolt to prevent rattling of the latter and hold it substantially stationary during relative movements between the frame 1 and axle 9. 23 indicates a tail member rigidly secured to the central portion of the axle 9 and extending rearwardly therefrom. The free end of the tail member 23 is provided with a stud shaft 24 which rotatably fits a bearing 25 provided in a block 26. The block 26 is provided on its opposite sides with trunnions 27, which are rotatably mounted in suitable bearings provided in a bracket 28, the latter being rigidly secured to the wall 13b. The trunnions 27 permit the axle 9 and tail member 23 to swing in a vertical plane and the shaft 24 permits these parts to rock on a longitudinal axis. The stud shaft 24 is preferably provided by forming in the rear end of the tail member 23 a threaded opening and inserting therein a threaded pin, the outer portion of which forms the shaft 24 fitting the bearing 25. The pin preferably extends through the bearing 25 and therebeyond it is threaded to take a nut 29. As the tail member 23 engages the block 26 on one side and the nut 29 engages therewith on its opposite side, the block and its mounting resist stresses which tend to impart to the axle 9 a torsional movement. The central portion of the axle 9 is provided on its outer side with a boss 30, a through opening 41a being formed in the axle and boss to form a support for the shank portion of a shaft 31. The inner end of the shaft 31 is provided with a head (not shown) which seats against the inner side of the axle. The outer end portion of the shaft is preferably reduced and rotatably fits a bushing provided in an opening formed in a guide block 32. The shaft 31 is provided with a reduced, threaded free end to take a nut 33 which clamps a washer against the resulting shoulder to hold the shaft in position and the block 32 in assembled relation therewith. The guide block 32 is slidably mounted between spaced guides 34, which depend from the frame 1, and permits relative movements vertically between the axle 9 and frame 1 on the trunnions 27. The guides 34 prevent lateral endwise movement of the axle 9. The guide block 32 accordingly cooperates with the trunnioned block 26 to maintain the axle in transverse relation to the frame 1 or at right angles to the normal direction of movement of the tractor.

As shown in Fig. 1a, the axes of the shafts 24 and 31 are co-incident and are disposed in a plane extending vertically through the central longitudinal axis of the frame 1, so that the axle 9 is rocked about such axis due to unevenness of the surface; for example, where one wheel 10 rides a hump, or enters a depression. Also, as the axle is mounted to swing about a transverse axis on the block 26, the frame and axle may move vertically relative to each other, to permit cushioning by the devices 18.

From the foregoing description it will be seen that the front axle 9 is mounted on or connected to the frame 1 at two spaced points disposed in the plane extending vertically through the central longitudinal axis of the frame, the connection on one side of the axle constituting a universal joint and the connection on the other side of the axle constituting a combined pivotal and slidable one. By this arrangement the axle is maintained in transverse relation to the frame and parallel to the other axle for the vehicle, but is free to rock and swing relative to the chassis while being driven by the driving mechanism hereinafter referred to.

The front axle 9 is provided at its opposite ends with knuckles 35 and is of a length to pivotally support the front wheels 10 in planes within the planes of the outer rear wheels 4. It will be noted that the tires on the wheels 4 and 10 are of large size in cross section (preferably of the balloon type), and this size of tire has been found to be advantageous for a tractor for use in mines as they tend to roll out the loose surface material, which accumulates on the floors of the entry and work rooms, to provide a substantially level surface, so that the tractor may be readily driven thereover at desirable speeds, when the trail car is empty and when the car is loaded. It will thus be seen that the expense of paving is eliminated. This tendency to maintain the floors leveled off is increased by using duplex wheels on the rear axle 14, as well as to increase the tractive effort between the axle and floors.

The wheels 10 are steered by the following elements: the spindle supporting knuckle for each wheel 10 is provided with an arm 36 to which is pivoted one end of a link 37, the other end of the link being pivotally connected intermediate the ends of a lever 38. One end of the lever 38 is pivotally mounted on an extension 38a integrally provided on the front side of the axle 9 at the adjacent side of the axes of the shafts 24 and 31, the opposite end of the lever 38 being connected by a link 39 to the corresponding end of the other lever 38. The lever 38 connected to the wheel 10 on the side adjacent to the steering wheel 40, is provided with an arm 41 to which the outer end of a rod 42 is connected. The inner end of the rod 42 is pivotally connected to an arm 43 which is fixed to the shaft of a gear mechanism enclosed in a housing 44, the shaft being supported in bearings carried by the plates 13a. The gear mechanism is operated by a shaft 45 having a universal joint connection with the steering column 46 carrying the steering wheel 40 at its outer end. The outer end portion of the steering column 46 is supported by a standard 47 formed of two relatively adjustable sections, the lower one being fixed to a pad provided on the housing 14a for the rear wheel axle 14 and the upper one being pivoted to a collar 47a through which the column 46 rotatably extends. As shown in Fig. 2, the sections of the standard 47 have overlapping portions slidably related and are secured together by bolts 47', which when loosened permit the upper section to be adjusted endwise, whereby the column 46 may be raised or lowered so as to locate the steering wheel 40 in any desired position for convenient operation by the driver.

The axle housings 14a are connected to the housing 48 for a suitable transmission mechanism arranged laterally of the central longitudinal axis of the frame 1 to provide between the wheel housings 3 space for the driver and mounting of the control devices, which are later referred to. The housing 48 is provided with a cradle 48a to which the motor 6 is rigidly secured and provided with an extension 49 to the outer end of which a torque member 50 is connected by a universal joint, one end of the torque member being trunnioned on the adjacent plate 12 and its opposite end being trunnioned on a bracket 51 depending from the frame 1. 52 indicates a rock shaft extending transversely of the frame 1 and mounted at its opposite ends in bearings provided on the lower ends of standards 53 fixed to and depending from the plates 12. Adjacent its opposite ends the shaft 52 is provided with arms 54 each connected to one end of a link 55, the opposite end of the link being connected to a lever 56 fixed to a shaft 57 and the latter in turn operating suitable brake shoes (not shown) arranged to engage a brake drum fixed to the adjacent wheel 4. One of the links 55 has connected to it a spring 58 anchored in an adjacent portion of the frame structure and arranged to normally bias the brake shoes to their inactive positions. 59 indicates a foot pedal suitably fixed to the rock shaft 52 and disposed in position for operation by the driver. Forward of the rear axle 14 I provide a floor 60 for the feet of the driver, the lateral portions of the floor being secured by bolts to the plates 12. Rearward of the axle 14 I provide a transverse strut member 61 suitably connected at its opposite ends to the plates 12. The strut 61 comprises upper and lower walls and a rear wall 61a to which is secured a casting 62 shaped to provide two recesses in which are mounted plungers 63 resting on coiled springs to form a cushioned support for a driver's seat 64, the latter being secured to the outer end of a strip 65 swingable at its inner end about a hinge 66 carried by the axle housing 14a.

67 indicates a lever pivoted on a plate fixed to the inner side of the housing 48 and connected by a link 68 to an arm 69 fixed to the rockshaft 52 and serving as an emergency brake lever.

70 indicates a controller preferably mounted on the inner side wall of a casing 71, the latter being fixed to the adjacent side plate 12 remote from the driver's seat 64. The casing 71 contains contact devices to control the motor circuit when the controller is operated to its "on" positions and back to neutral position. 72 indicates a cut-out of any suitable construction and connected in the motor circuit. The movable member of the cut-out 72 is connected by a link 73 to an arm fixed to the rock shaft 52 so that when the foot pedal 59 or emergency lever 67 is operated to apply the brakes, the motor circuit is automatically broken.

From the foregoing description it will be noted that the motor and operating device therefor and brake control means, driver's seat and flooring are arranged to maintain a low over-all vertical height so as to adapt the tractor to operation in a mine where the ceiling and overhead timbers are low. In this connection, the transmitting mechanism and motor therefor are in direct connected relation and disposed at one side of the longitudinal axis of the tractor frame so as to locate the driver on the other side of such axis and thus permit the driver to be located at a low level; furthermore, the driver's seat is arranged rearward of the rear axle and the floor for his feet are on the opposite side thereof so as to position the driver at the lowest possible level to eliminate danger of his head coming in contact with overhead or depending walls.

Referring to Figs. 7 to 10, inclusive, I have shown a modified form of construction wherein the driver's station is between the front and rear wheels and the operating devices are associated therewith to permit the driver to lie on one side on a portion of the frame, so that his entire body is in a low position while operating the tractor, whereby operations may be carried on in areas where the head room is reduced.

In these views, 74 indicates as an entirety a frame having a main section 74a, which lies over the axle 9x for the front wheels 10x and a drop section 74b, which is disposed in a plane below and extends to a point rearward of the housings 14x for the axle for the rear wheels 4x and also extends laterally at either side of the main section 74a in front of the rear wheels 4x to form guards therefor, so that the rear wheels are within the lateral sides of the frame. Wheel housings 75 for the front wheels 10x are rigidly connected to the lateral portions of the drop section 74b and a transversely arranged frame member 76 disposed forward of the front wheels 10x and depending from the main section 74a. The frame member 76 consists of inner and outer vertically disposed plates 76a, 76b, rigidly connected together at their opposite ends, the outer plate 76b being curved and related to the outer side edges of the housings 75 to form a diverging contour, whereby the tractor may be driven into engagement with swinging doors and readily cause the same to open as the tractor is driven forwardly. The lateral portions of the drop section 74b are provided with up-standing side walls 77, and the front end of the drop section 74b is connected to the main section by a transverse vertical wall 77a. As shown, the drop section 74b between the walls 77 and wall 77a and rear portions of the wheel housings 75 form the driver's station and enable the driver to lie on one side with his head and one shoulder propped up by his adjacent arm, as shown in dotted lines.

The front axle 9x is mounted to rock about a longitudinal axis and also swing vertically similarly to that already described, except that the supporting devices are reversed; that is, the axle is provided with a forwardly extending arm 78 mounted to rotate on a longitudinal axis and trunnioned on a transverse axis on a bracket 79 and on its inner side the axle is provided with a stud shaft fitting a bearing in a block which is guided vertically between guides 80. The relative movement between the axle 9x and frame section 74a is cushioned by cushioning means shown at 81, the elements of which correspond to like parts shown in Figs. 1a, 2 and 6. The steering connections for the front wheels comprise the following: The spindle of each wheel is provided with an arm 82 to which is pivotally connected a link 82a, the link in turn being pivotally connected to one end of a lever 83. The lever 83 is fulcrumed on a stud shaft carried by the axle 9x and its opposite end is connected by a rod 84 to the corresponding end of the other lever 83. One of the levers 83 is connected by a rod 85 to an arm 86, which, through suitable gearing within a housing 87, is operated by a steering column 87a having a steering wheel 88. The housing 87 is mounted on the wall 77a, the driven shaft of the gearing extending through the wall as shown in Fig. 8. The steering wheel 88 is preferably arranged centrally of the frame 74 so that the driver may lie on either side, thus adapting the use of either hand for steering to suit the convenience of the driver.

89 indicates a motor drivingly connected through a shaft and suitable power transmitting mechanism within a housing 48x to the axle for the rear wheels 4x. The motor 89 is fixed to a cradle 89a, which is preferably formed integral with the housing 48x, the outer end of the cradle 89a being supported by a standard 89b mounted on the drop section 74b.

90 indicates a pedal mounted on a vertically disposed stud shaft 91 carried by the drop section 74b adjacent each outer side thereof, so as to be operated by a foot of the driver when lying on either side. Each pedal 90 swings in a plane parallel to the drop section 74b and operates a pair of brake shoes within a brake drum 92 fixed to the outer end of the propeller shaft which is driven by the motor 89. Each pedal 90 is connected at 91' to one end of a flexible rod mounted within a tube 93, the other end of the rod being connected to a bell crank 94 pivoted on the drop section 74b and the bell-crank in turn being connected by a flexible rod mounted within a tube 95 to that element which operates the brake shoes within the drum 92. The brake shoes are normally biased out of engagement with the brake drum 92, and applied when either pedal 90 is operated in an outward direction, against the tension of the adjacent spring 90a. 96 indicates an emergency brake operating lever pivoted on the main section 74a and connected by a flexible rod within a tube 96a to an arm of the bell crank 94, as shown in Fig. 7. As shown, the rod in each tube 93, 95 and 96a is provided at its inner end with a slotted link which forms the connection between the rod and the bell crank 94, the slot permitting either rod when operated to operate the bell crank without operating any one of the other rods. The emergency brake lever 96 may be locked in operated position and released by means of a trigger engaging a ratchet 96b.

97 indicates a controller having a handle 97a for operating the motor 89, the current for which is supplied by suitable batteries carried by the trail car (not shown), which is provided with a tongue B suitably coupled to the rear end of the frame by a pin b. The controller is preferably mounted on a casing 98 which contains suitable contact devices to control the motor circuit.

99 indicates a suitable cut-out or switch interposed in the circuit for the motor 89, the movable member of the cut-out being connected by linkage 99' to the bell-crank 94, so that when the latter is operated by either pedal 90 or the emergency brake lever 96 to apply the brake shoes to the drum 92, the circuit to the motor 89 is broken.

To those skilled in the art to which my invention relates many changes in construction and widely differing embodiments and applications of the invention will suggest themselves without departing from the spirit and scope of the invention. My disclosures and the description herein are purely illustrative and not intended to be in any sense limiting.

What I claim is:

1. In a tractor providing minimum over-all height for use in a mine, the combination of a frame, having rear driven wheels and front steerable wheels, power supply means on said frame, spaced longitudinally extending plates depending from said frame, an axle arranged to support said steerable wheels below said frame and within its front end and sides, the rear portion of said frame being cut away between said rear wheels, a motor mounted on said frame, power transmitting means between said motor and the axle for said rear wheels, arranged laterally of the longitudinally axis of said frame, a rock shaft supported by said plates forward of the axle for said rear wheels, a brake for the tractor, a pedal operatively connected to said rock shaft, and a seat for the driver arranged behind the rear axle and at substantially the same height, and devices for controlling said motor and steering said steerable wheels arranged adjacent said seat.

2. In a tractor of minimum over-all height, the combination of a frame having driven wheels and steerable wheels adjacent to and supporting the opposite ends of said frame, power supply means on said frame, spaced, longitudinally extending plates depending from said frame, a cross member between said plates, an axle arranged to support said steerable wheels below said frame and within its front end and sides and having connections with said cross member and frame, that portion of said frame between the rear supporting wheels being cut away, a motor and power transmitting means between it and the axle for said driven wheels, arranged within said cut-away portion of the frame and laterally of the longitudinal axis of said frame, a rock shaft supported by said plates forward of the axle for said rear wheels, a brake for the tractor, a pedal operatively connected to said rock shaft, connections between said shaft and said brake, a seat within said cut-away portion of the frame, and devices for controlling said motor and steering said steerable wheels arranged adjacent to said seat.

3. In a tractor of minimum over-all height, the combination of a frame having rear driven wheels and front steerable wheels, power supply means on said frame, spaced, longitudinally extending plates depending from said frame, an axle arranged to support said steerable wheels below said frame and within its front end and sides, the rear portion of said frame being cut away between said rear wheels, a motor arranged in said cut away portion and power transmitting means between said motor and the axle for said rear wheels, arranged laterally of the longitudinal axis of said frame, a flooring forward of and below the axle for said rear wheels and supported by said plates, a rock shaft supported by said plates forward of said flooring, a brake for the tractor, a pedal operatively connected to said rock shaft, connections between said shaft and said brake, a seat rearward of the axle for said rear wheels and at substantially the same height, and devices for controlling said motor and steering said steerable wheels arranged adjacent to said seat.

4. In a tractor providing minimum over-all height for use in a mine, the combination of a frame having rear driven wheels and front steerable wheels, the axle for said steerable wheels being arranged to support the latter below said frame and within its front end and sides, wheel housings for said rear wheels, said frame having a rounded front end and diverging sides extending to the outer side edges of said housings, a motor drivingly connected to the axle for said rear wheels, a driver's station comprising a flooring forward and beneath the level of the rear wheel axle and a seat rearward thereof, said motor and its connections with the rear wheel axle and said driver's station being disposed side by side substantially upon opposite sides of the longitudinal axis of said frame.

FRANK STONER.